(12) United States Patent
Mahrenholtz et al.

(10) Patent No.: US 12,398,555 B2
(45) Date of Patent: Aug. 26, 2025

(54) UNDERCUT ANCHOR

(71) Applicant: BLACK & DECKER INC., New Britain, CT (US)

(72) Inventors: Philipp Mahrenholtz, Frankfurt (DE); Alan Armiento, New Rochelle, NY (US)

(73) Assignee: BLACK & DECKER INC., New Britain, CT (US)

( * ) Notice: Subject to any disclaimer, the term of this patent is extended or adjusted under 35 U.S.C. 154(b) by 290 days.

(21) Appl. No.: 17/643,323

(22) Filed: Dec. 8, 2021

(65) Prior Publication Data
US 2022/0162849 A1    May 26, 2022

(51) Int. Cl.
| | |
|---|---|
| F16B 13/06 | (2006.01) |
| E04B 1/41 | (2006.01) |
| F16B 11/00 | (2006.01) |
| F16B 13/08 | (2006.01) |
| F16B 13/12 | (2006.01) |

(52) U.S. Cl.
CPC .......... *E04B 1/4157* (2013.01); *E04B 1/4121* (2013.01); *F16B 11/008* (2013.01); *F16B 13/06* (2013.01); *F16B 13/066* (2013.01); *F16B 13/0833* (2013.01); *F16B 13/0858* (2013.01); *F16B 13/124* (2013.01); *F16B 13/126* (2013.01); *F16B 13/128* (2013.01)

(58) Field of Classification Search
CPC .. F16B 13/066; F16B 13/065; F16B 13/0833; F16B 13/0858; F16B 13/06; F16B 2013/007
USPC .............................................. 411/55, 54, 54.1
See application file for complete search history.

(56) References Cited

U.S. PATENT DOCUMENTS

| | | | | |
|---|---|---|---|---|
| 4,339,217 A | * | 7/1982 | Lacey | F16B 13/066 411/60.2 |
| 4,560,311 A | * | 12/1985 | Herb | F16B 13/0891 411/79 |
| 4,702,654 A | * | 10/1987 | Frischmann | F16B 13/065 411/60.2 |
| 4,984,945 A | * | 1/1991 | Bergner | F16B 13/0858 411/60.1 |

(Continued)

*Primary Examiner* — Flemming Saether
(74) *Attorney, Agent, or Firm* — Kofi A. Schulterbrandt

(57) ABSTRACT

An undercut anchor having an at least partially threaded rod portion having an outer thread diameter $D_{ROD}$. The anchor having an expansion feature coupled to the rod portion and an expansion sleeve having an outer diameter $D_{OUTER\ SLEEVE}$, an inner diameter $D_{INNER\ SLEEVE}$ and a wall thickness $T_{SLEEVE}$. Furthermore, the expansion sleeve has a plurality of circumferentially distributed fingers which are configured to flex outwards when a ramp portion of length $L_{RAMP}$ of each of the respective fingers is forced against the expansion feature during installation of the undercut anchor. The fingers each having a length $L_{FINGER}$ and a distance therebetween of $W_{SLOT}$.

4 Claims, 7 Drawing Sheets

(56) References Cited

U.S. PATENT DOCUMENTS

| | | | | |
|---|---|---|---|---|
| 5,807,049 A | * | 9/1998 | Beck | F16B 13/004 |
| | | | | 411/31 |
| 5,911,550 A | * | 6/1999 | Popp | F16B 13/0858 |
| | | | | 411/30 |
| 6,027,292 A | * | 2/2000 | Raber | F16B 13/065 |
| | | | | 411/60.3 |
| 7,357,613 B2 | * | 4/2008 | Houck | F16B 13/0858 |
| | | | | 411/60.3 |
| 10,132,344 B2 | * | 11/2018 | Miyanaga | F16B 13/065 |

\* cited by examiner

US 12,398,555 B2

UNDERCUT ANCHOR

FIELD OF THE INVENTION

This specification concerns undercut anchors for securing objects to concrete.

BACKGROUND OF THE INVENTION

Undercut anchors are used for securing objects to a concrete surface, wherein undercut anchors have a higher pull out strength than other types of mechanical anchors such as drop-in anchors, screw anchors and expansion anchors.

FIGS. 1 to 6 show the steps involved in an undercut anchor installation method.

A hole 10 is drilled in a concrete surface using a hammer drill like in FIG. 1, wherein the hole 10 is generally cylindrical. Next an undercut region 12 is formed near the base of the hole 10 using an undercut drilling bit like in FIG. 2, wherein the undercut region 12 is essentially a conical section of the hole 10 which increases in diameter along an axis extending into the hole 10. The hole 10 is then cleaned by vacuuming out dust like in FIG. 3 and subsequently an undercut anchor 14 is inserted into the hole 10 like in FIG. 4. The undercut anchor 14 has a threaded rod section 16 fixed relative to an expansion feature 18. A sleeve 20 is located around the threaded rod section 16. The sleeve 20 at its end adjacent the expansion feature 18 has an expansion portion 22 defined by a series of axially extending, evenly circumferentially arranged, slots in the sleeve 20 for defining a plurality of fingers which can be caused to bend outwards by the expansion feature 18.

With further reference to FIG. 4 the external diameter of the sleeve 20 is selected to be slightly less than the internal diameter of the hole 10 such that upon inserting the anchor 14 into the hole 10 no friction is experienced between the inner surface of the hole 10 and the external surface of the sleeve 20. The anchor 14 is pushed into the hole 10 so that the expansion feature 18 touches the bottom of the hole 10 and so that the expansion portion 22 of the sleeve 20 extends into the undercut region 12. To facilitate movement of the expansion portion 22 into the undercut region 12 a cylindrical driver 24 is placed around the upper section of the threaded rod 16 and into engagement with the upper end of the sleeve 20. Impacting the cylindrical driver 24 with a hammer 26 for example pushes the sleeve 20 down into the hole, wherein such movement causes the expansion portion 22 to outwardly deform by cooperating with the expansion feature 18. The resulting arrangement is shown in FIG. 5. The length of the sleeve 20 is selected so that the sleeve 20 is located below the concrete surface when the undercut anchor 14 is installed. In through-bolt applications however the sleeve 20 will be long enough to extend from the hole after installation.

An object can then be fastened to the concrete using a nut 26 and washer 24 in conjunction with the installed undercut anchor. The upper part of the threaded rod 16 is caused to extend through a hole in the object to be secured. The washer 25, and subsequently the nut 26, are placed on the upper part of the threaded rod 16. Upon tightening the nut 26 against the washer 25, and thereby the object to be secured, the expansion feature 18 is urged in a pull-out direction, which further urges the expansion portion 22 against the conical surface defined by the undercut region 12. It will thus be appreciated that the expansion feature 18, the expansion portion 22 and the conical surface defined by the undercut region 12 of the hole 10 cooperate to resist pull-out of the undercut anchor 14.

The undercut angle $\theta$ illustrated in FIG. 6 is the angle between opposing surface sections of the conical surface defined by the undercut region 12. In other words, the undercut angle $\theta$ is basically the cone angle of the conical surface defined by the undercut region 12. Pull out strength of an undercut anchor is increased by increasing the undercut angle $\theta$, however, until recently it has only been possible to form an undercut region 12 having an undercut angle $\theta$ in the range of 20 to 30 degrees due to limitations with drilling technology.

Some undercut anchors like the HDA-P™ and HDA-T™ (undercutanchors available from Hilti) form their own undercut region during installation. A drill is only required to form a cylindrical hole in a concrete surface for receiving the HDA-P™ and HDA-T™ undercut anchors. During installation, while drawing its expansion feature against its expansion sleeve, the HDA-P™ and HDA-T™ undercut anchors are themselves rotated whereby such rotation causes the anchor to cut its own undercut region in the concrete. Undercut angles $\theta$ capable of being achieved with the HDA-P™ and HDA-T™ undercut anchors can reach around 55 degrees, however, such anchors are highly engineered and so are complicated to manufacture compared to traditional undercut anchors which require a pre-drilled undercut region. What is needed therefore is a compromise, namely an undercut anchor solution that can achieve undercut angles $\theta$ greater than 30 degrees while remaining simpler to manufacture than an undercut anchor which forms its own undercut section during an installation process.

Due to improvements in drilling technology undercut drilling bits are now commercially available that can form undercut regions having undercut angles up to about 40 degrees (e.g., measured between opposite surfaces of the hold). As an example, the DEWALT® branded undercut drilling bits DFX21381, DFX21121, DFX21581 and DFX21341 can reliably drill undercut regions in concrete having an undercut angle up to about 40 degrees. Applicant has discovered that certain cleverly designed anchors may have significantly improved capacity when under cut holes have angles of 31 degrees or larger when measured between opposite sides of the cone shaped portion of the hole. For example, there are significant unexpected load capacity improvements between about 37 and about 43 degrees and between about 36 and about 43 degrees and between about 35 and about 43 and between about 34 and about 43 degrees.

Aspects of the present invention relate to an undercut anchor which is designed to function in holes having an undercut angle $\theta$ up to about 40 degrees (in particular, about 37 degrees to about 43 degrees).

BRIEF SUMMARY OF THE INVENTION

According to the present invention there is provided an undercut anchor including an at least partially threaded rod portion having an outer thread diameter $D_{ROD}$; an expansion feature coupled to the rod portion; an expansion sleeve having an outer diameter $D_{OUTER\ SLEEVE}$, an inner diameter $D_{INNER\ SLEEVE}$ and a wall thickness $T_{SLEEVE}$. The expansion sleeve has a plurality of circumferentially distributed fingers which are configured to flex outwards when a ramp portion of length $L_{RAMP}$ of each of the respective fingers is forced against the expansion feature during installation of the undercut anchor. The fingers each have a length $L_{FINGER}$ and a distance therebetween of $W_{SLOT}$. The undercut anchor is configured according to at least one of the following: the ratio of $D_{OUTER\ SLEEVE}$ to $D_{ROD}$ is between 1.50 to 2.00; the ratio of $D_{INNER\ SLEEVE}$ to $D_{ROD}$ is between 1.00 to 1.15; the ratio of $T_{SLEEVE}$ to $D_{ROD}$ is between 0.25 to 0.50; the ratio of $L_{FINGER}$ to $D_{ROD}$ is between 1.00 to 1.50; the ratio of $L_{RAMP}$ to $D_{ROD}$ is between 0.15 to 0.30; or the ratio of $W_{SLOT}$ to $D_{ROD}$ is between 0.05 to 0.20.

BRIEF DESCRIPTION OF THE DRAWINGS

Various aspects and embodiments of the invention will now be described by way of non-limiting example with reference to the accompanying drawings, in which.

DETAILED DESCRIPTION OF THE PREFERRED EMBODIMENT

Figure 1:
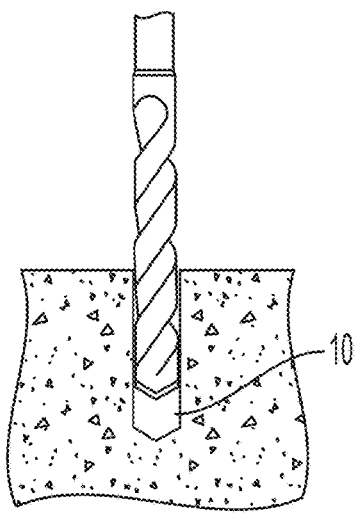
FIGS. 1 to 6 are schematic illustrations of the steps involved in a prior art installation method for installing an undercut anchor.
Figure 2:
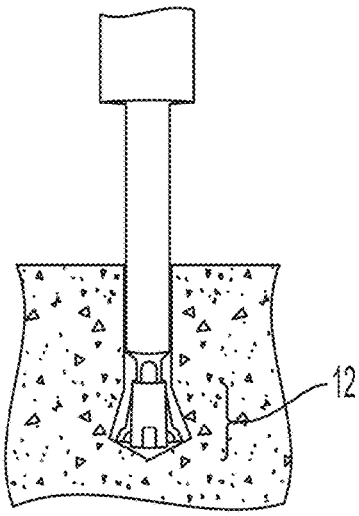
Figure 3:
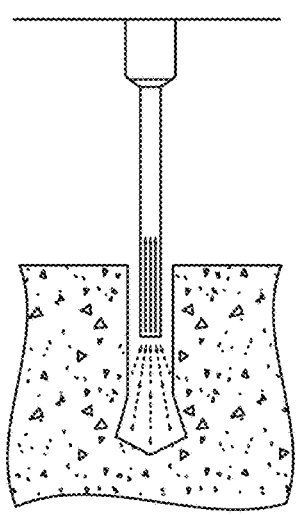
Figure 4:
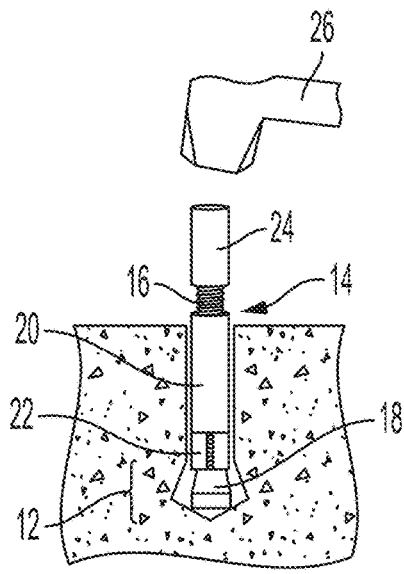
Figure 5:
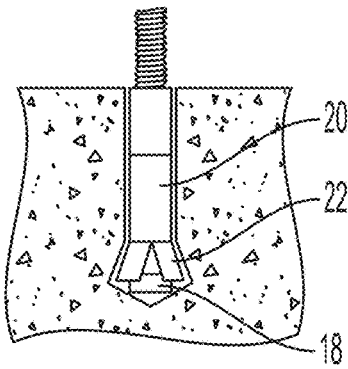
Figure 6:
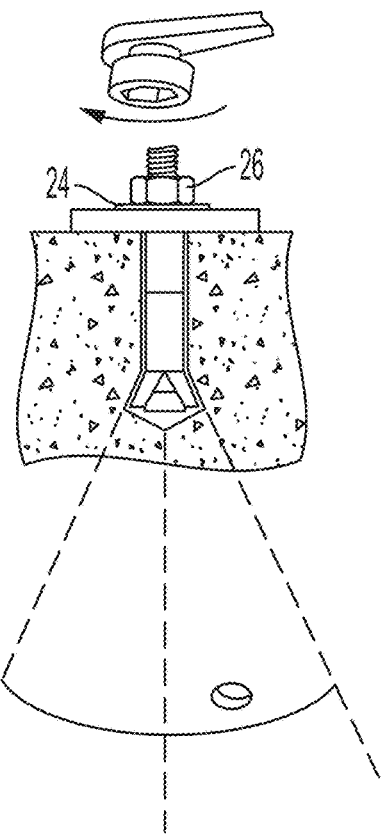
Figure 7:
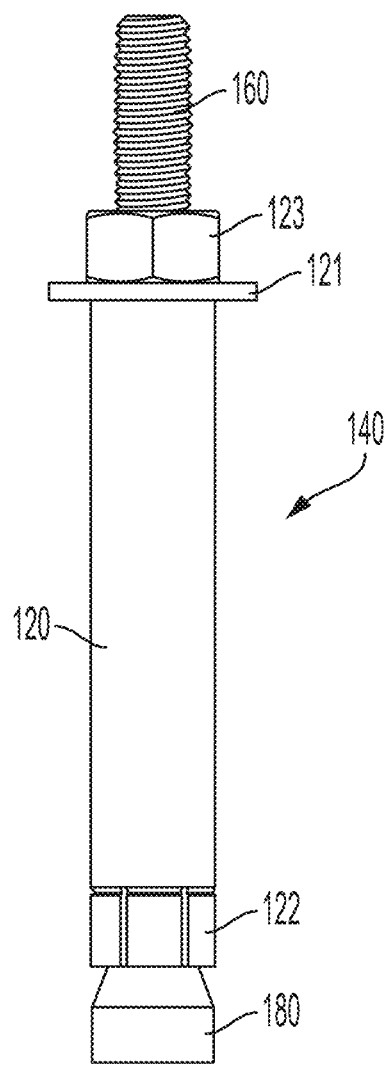
FIG. 7 is a schematic illustration of an undercut anchor.

FIG. 7 illustrates an undercut anchor 140 which is designed to function in holes having an undercut angle θ up to about 40 degrees, wherein a washer 121 and nut 123 are shown attached to the undercut anchor 140. The undercut anchor 140 functions in a similar way to the undercut anchor described in the background section and cooperates with the washer 121 and nut 123 to clamp an object to a concrete surface, however, certain dimensions of the undercut anchor 140 have been specifically chosen in order to achieve enhanced performance of the anchor 140 in holes having an undercut angle θ up to about 40 degrees. Therefore, an installation of the undercut anchor of the present invention may include a hole with an undercut angle θ of about 37 to about 43 degrees and/or may include an expansion feature with an expansion angle θ of about 37 to about 43 degrees. The undercut anchor 140 is made of steel.

The undercut anchor 140 can be made of carbon steel such as A36 carbon steel or B7 carbon steel. In some embodiments the carbon steel is zinc plated.

Alternatively, the undercut anchor 140 can be made of 316 stainless steel, wherein the 316 stainless steel version is particularly suitable for exterior use and other applications where a high level of corrosion resistance is required.

Figure 9:
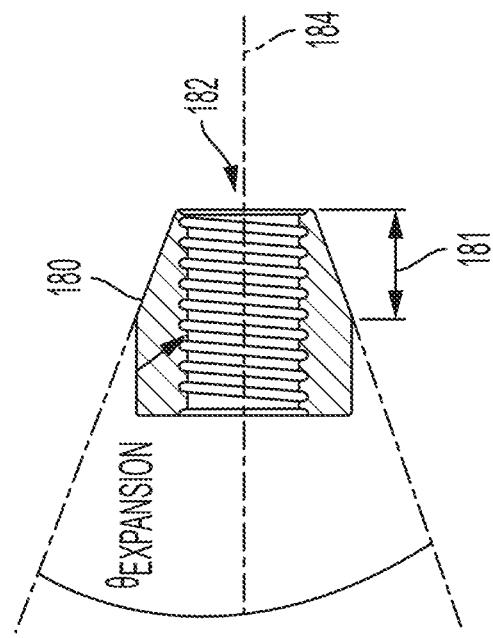
FIG. 9 is a schematic illustration of a cross-section of the expansion feature in FIG. 8.
Figure 8:
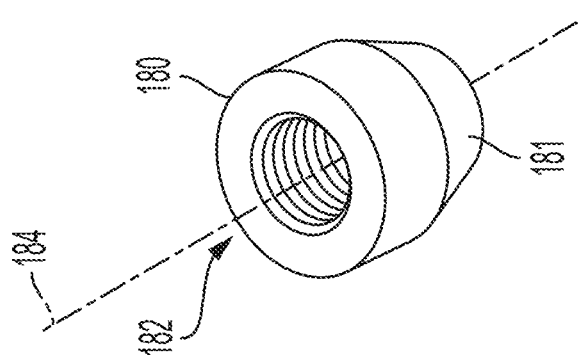
FIG. 8 is a schematic illustration of the expansion feature of the anchor in FIG. 7.
Figure 10:
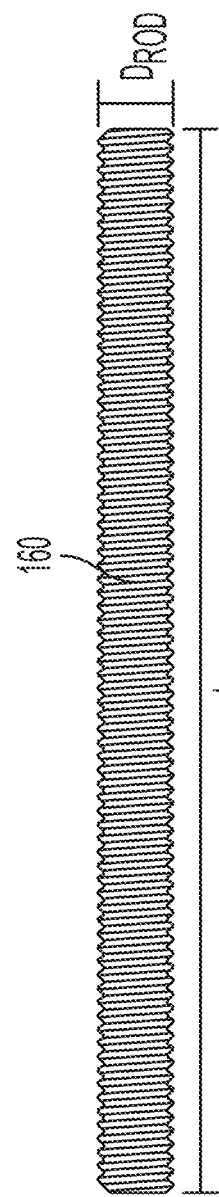
FIG. 10 is a schematic illustration of the threaded rod section of the anchor in FIG. 7.

A threaded rod 160 is fixed relative to an expansion feature 180. With reference to FIGS. 8 to 10 the threaded rod 160 has an outer thread diameter $D_{ROD}$ and a length $L_{ROD}$.

The expansion feature 180 defines a conical portion 181 having a cone angle $\theta_{EXPANSION}$. The expansion feature 180 defines an opening 182 which extends along the major axis 184 of the expansion feature 180. This opening 182 is threaded and thereby is capable of threadably connecting with the threaded rod section 160. In order to secure the expansion feature 180 to the threaded rod section 160 adhesive is applied to the threaded internal surface of the expansion feature 180 before connecting it with the threaded rod section 160.

Referring to FIG. 7 a cylindrical sleeve 120 is located around the threaded rod 160. The end of the sleeve 120 adjacent the expansion feature 180 has an expansion portion 122. FIGS. 11 to 14 show the sleeve 120 has an outer diameter $D_{OUTER\ SLEEVE}$, an inner diameter $D_{INNER\ SLEEVE}$, a wall thickness $T_{SLEEVE}$ and a length $L_{SLEEVE}$.

The expansion portion 122 has a plurality of axially extending slots $123_1$ to $123_6$ evenly circumferentially arranged around the sleeve 120, which defines a plurality of fingers $125_1$ to $125_6$. The width of each slot $123_1$ to $123_6$, in other words the distance between adjacent fingers $125_1$ to $125_6$ is $W_{SLOT}$. The fingers $125_1$ to $125_6$ have the same length $L_{FINGER}$. A weakened portion $127_1$ to $127_6$ of the sleeve 120 is located at the proximal end of each of the fingers $125_1$ to $125_6$, only three of which are shown in FIG. 10. The weakened portions $127_1$ to $127_6$ enable the fingers $125_1$ to $125_6$ to flex outwards under force from the expansion feature 180 in use.

Figure 11:
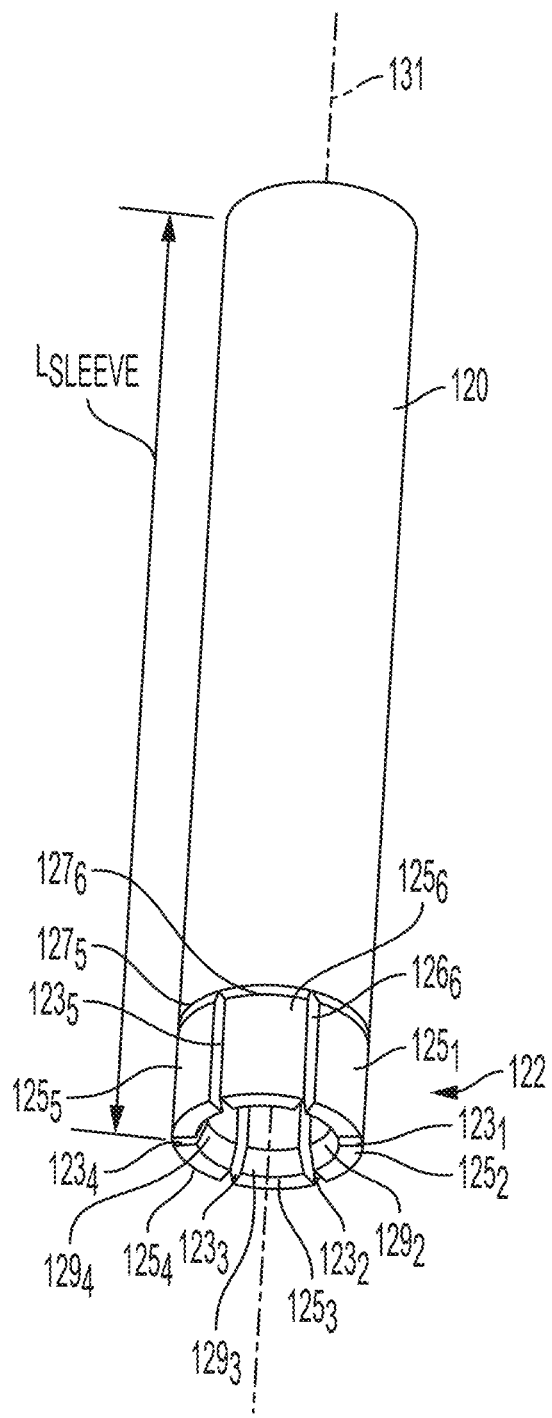
FIG. 11 is a schematic illustration of the sleeve of the anchor in FIG. 7.
Figure 12:
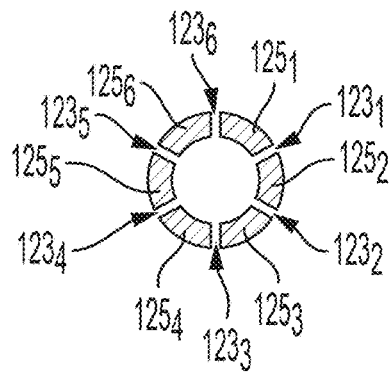
FIG. 12 is a schematic illustration of the bottom end of the sleeve in FIG. 11.
Figure 13:
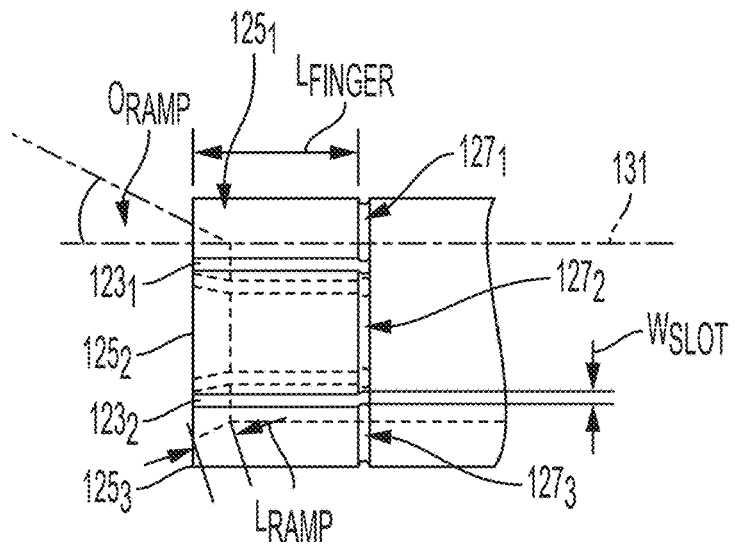
FIG. 13 is a partially transparent schematic illustration of the bottom end of the sleeve in FIG. 11.
Figure 14:
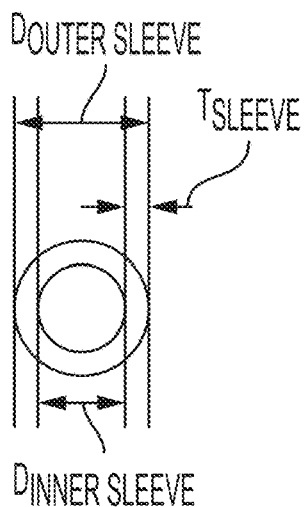
FIG. 14 is a schematic illustration of the top end of the sleeve in FIG. 11.

With particular reference to FIGS. 11 and 13 the inner distal end of each of the fingers $125_1$ to $125_6$ defines a ramped surface portion $129_1$ to $129_6$ only three of which are shown in FIG. 11. The length of each ramped surface portion $129_1$ to $129_6$ is $L_{RAMP}$. The angle $\theta_{RAMP}$ of the ramped surface portions $129_1$ to $129_6$ relative to the major axis 131 of the sleeve 120 is selected to match the slope of the conical portion 181 of the expansion feature 180, wherein the angle $\theta_{RAMP}$ of the ramped surface portions $129_1$ to $129_6$ is therefore half the cone angle $\theta_{EXPANSION}$ of the conical portion 181.

It is known to categorise different sized undercut anchors as ⅜", ½", ⅝" and ¾" varieties, wherein these figures are indicative of the outer thread diameter $D_{ROD}$ (these values being denoted in inches, namely 0.375", 0.5", 0.625" and 0.75"). For each of these four categories the applicant has determined from experimentation the optimum parameters listed in the table 1 below which give optimum use performance of the heretofore described undercut anchor 140 in holes in concrete with an undercut angle up to 40 degrees. Such enhanced performance is characterised by maximising pull-out resistance of the undercut anchor 140 for the respective dimension of the outer thread diameter $D_{ROD}$.

TABLE 1

| | | | | |
|---|---|---|---|---|
| $D_{ROD}$ (Inches) | 0.375 | 0.5 | 0.625 | 0.75 |
| $D_{OUTER\ SLEEVE}$ (Inches) | 0.6875 | 0.8125 | 1 | 1.25 |
| $D_{INNER\ SLEEVE}$ (Inches) | 0.405 | 0.535 | 0.665 | 0.79 |
| $T_{SLEEVE}$ (Inches) | 0.14125 | 0.13875 | 0.1675 | 0.23 |
| $L_{FINGER}$ (Inches) | 0.495 | 0.532 | 0.661 | 0.881 |
| $L_{RAMP}$ (Inches) | 0.075 | 0.112 | 0.149 | 0.187 |
| $W_{SLOT}$ (Inches) | 0.055 | 0.055 | 0.055 | 0.055 |

Parameters of the undercut anchor 140 not listed in the above table 1 can be varied depending on the usage context and specific user requirements. For example the length $L_{SLEEVE}$ of the sleeve 120 (see FIG. 11) can be selected so that the sleeve 120 is totally located below the concrete surface in which the undercut anchor 140 is installed, although in through-bolt applications the sleeve 120 may be required to protrude out of the hole in which the anchor 140 is received in order to extend through an opening in the object that is being fixed to a concrete surface. Also for each set of parameters listed in table 1 the cone angle $\theta_{EXPANSION}$ of the conical portion 181 can be adjusted, wherein it may range between 24 and 56 degrees and may for example be 40 degrees. The reader is reminded that the angle $\theta_{RAMP}$ of the ramped surface portions $129_1$ to $129_6$ relative to the major axis 131 of the sleeve 120 is selected to match the slope of the conical portion 181 of the expansion feature 180, wherein the angle $\theta_{RAMP}$ of the ramped surface portions $129_1$ to $129_6$ is therefore half the cone angle $\theta_{EXPANSION}$ of the conical portion 181.

Table 2 below expresses the experimentally determined ranges of parameters which give acceptable use performance of the undercut anchor 140 in holes in concrete with an undercut angle up to about 40 degrees. Such acceptable use performance is characterised by maximising pull-out resistance of the undercut anchor 140 for the selected dimension of the outer thread diameter $D_{ROD}$.

TABLE 2

|  | Minimum | Maximum |
|---|---|---|
| $D_{OUTER\ SLEEVE}/D_{ROD}$ | 1.50 | 2.00 |
| $D_{INNER\ SLEEVE}/D_{ROD}$ | 1.00 | 1.15 |
| $T_{SLEEVE}/D_{ROD}$ | 0.25 | 0.50 |
| $L_{FINGER}/D_{ROD}$ | 1.00 | 1.50 |
| $L_{RAMP}/D_{ROD}$ | 0.15 | 0.30 |
| $W_{SLOT}/D_{ROD}$ | 0.05 | 0.20 |

It is here stated that the respective sets of unexpected, parameters in Table 1 for the different anchor sizes fall within the scope of the range expressed in Table 2.

Figure 17:
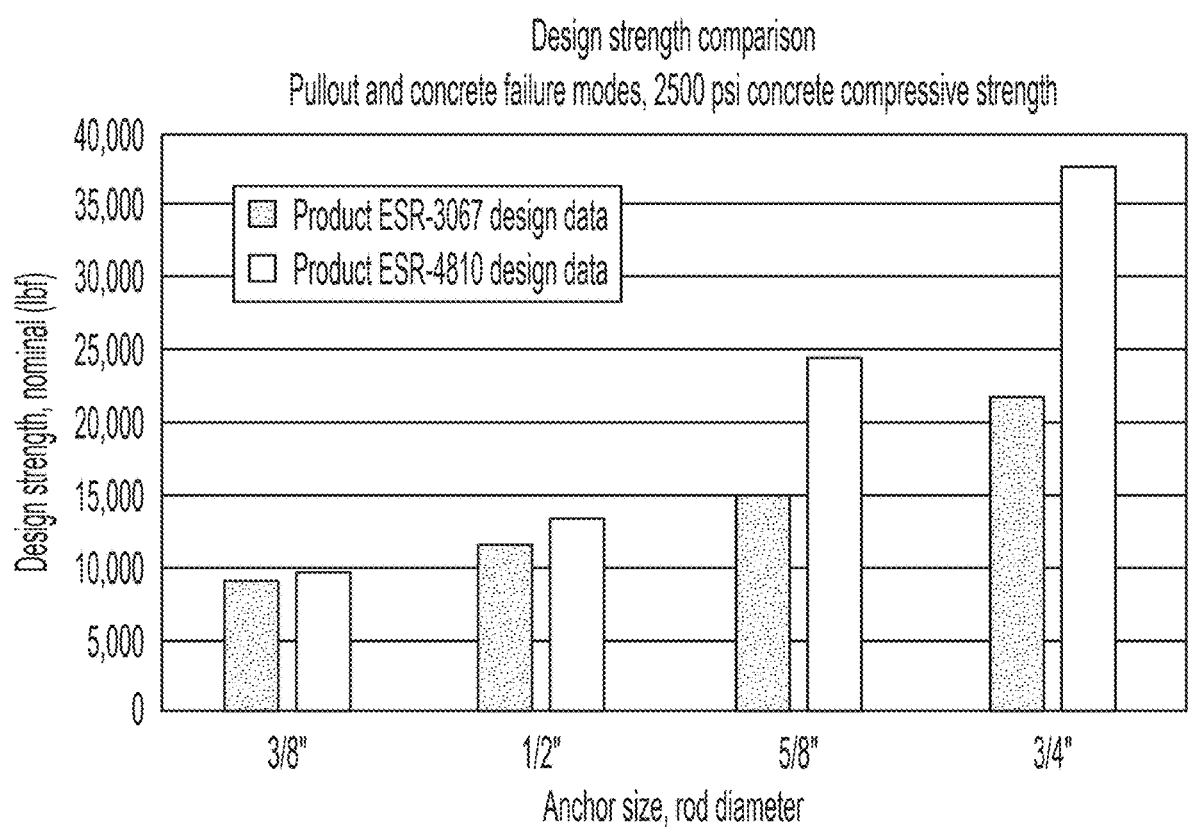
FIG. 17 is a table showing performance of the anchor in FIG. 7 relative to that of a prior art anchor.

Performance data of the heretofore described undercut anchor 140 relative to a prior art undercut anchor is illustrated in FIG. 17. This drawing shows for such anchors the design strength, nominal vs. different sized versions of such undercut anchors, namely ⅜", ½", ⅝" and ¾" varieties wherein as before these figures are indicative of the outer thread diameter $D_{ROD}$. Some explanation of the data in FIG. 17 is as follows. ICC Evaluation Service (ICC-ES) issues technical approvals for anchors in order to facilitate their launch in the United States. The ICC-ES report for the undercut anchor 140 described in this specification which is optimised for use in holes having an undercut angle θ up to about 40 degrees is ICC-ES report number ESR-4810 issued in June 2021 such report being published by and available from ICC-ES here https://icc-es.org/report-listing/esr-4810/ and wherein the contents of this report are incorporated herein by reference. The ICC-ES report for a prior art undercut anchor which is not optimised for use in holes having an undercut angle θ up to about 40 degrees is ICC-ES report number ESR-3067 such report being published by and available from ICC-ES here https://icc-es.org/report-listing/esr-3067/ and wherein the contents of this report are incorporated herein by reference. The undercut anchor which is the subject of ICC-ES report number ESR-3067 is optimised for use in holes having an undercut angle θ up to about 22 degrees. Based on the information set out in ICC-ES report numbers ESR-3067 and ESR-4810 a person skilled in the art will be able to calculate the information illustrated in FIG. 17 without exercising inventive activity.

It will be appreciated that whilst various aspects and embodiments have heretofore been described, the scope of the present invention is not limited thereto and instead extends to encompass all arrangements, and modifications and alterations thereto, which fall within the spirit and scope of the appended claims.

Figure 15:
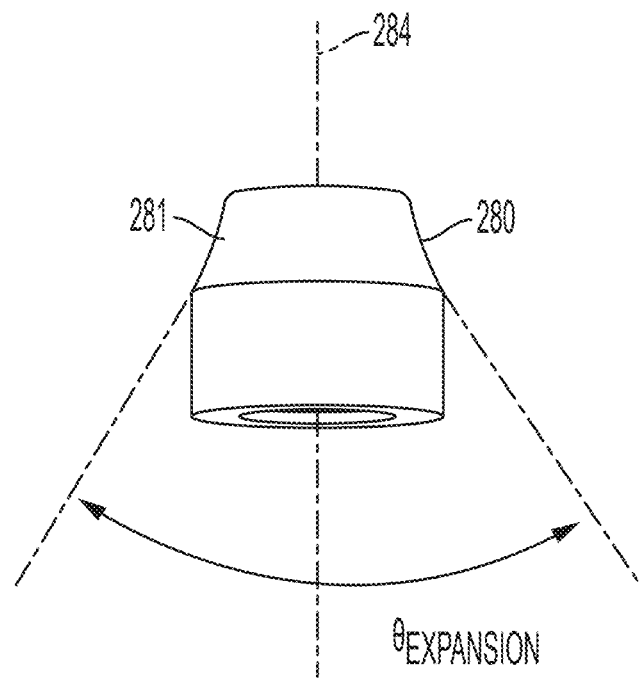
FIG. 15 is a schematic illustration of an alternative expansion feature.
Figure 16:
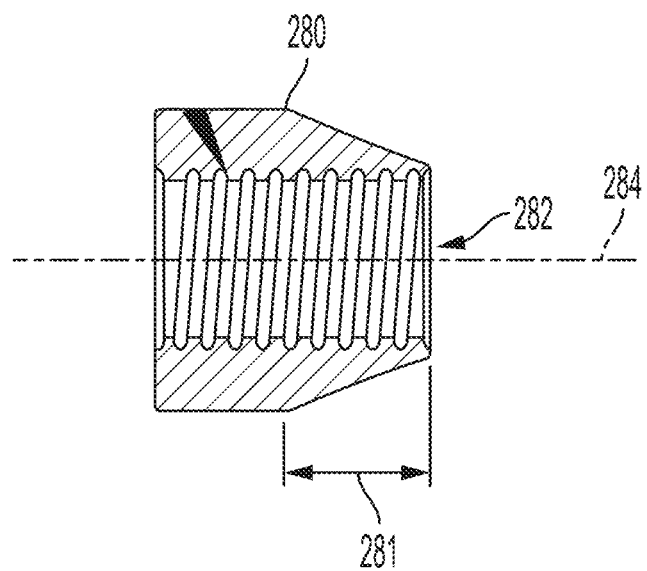
FIG. 16 is a schematic cross-sectional illustration of the expansion feature in FIG. 15.

In some embodiments the expansion feature 180 has a different shape. FIGS. 15 and 16 show an alternative expansion feature 280 wherein corresponding reference numerals increased by 100 indicate like features in the embodiment of FIGS. 8 and 9. The difference between the previously described expansion feature 180 and the alternative expansion feature 280 is that the conical section 281 has an outer diameter which increases in a non-linear manner from one end of the conical section 281 to the other. At the narrowest part of the conical section 281 the cone angle defined by the outer surface is small, wherein the cone angle increases based on distance along the major axis 284 of the expansion feature 280. At the widest part of the conical section 281 the cone angle $\theta_{EXPANSION}$ corresponds in dimension to that of the previously described expansion feature 180. This trumpet-shaped expansion feature 280 provides that less force is required to be imparted between the sleeve 120 and expansion feature 280 in order for the expansion feature 280 to outwardly deform the fingers $125_1$ to $125_6$ of the expansion portion 122.

In some embodiments the expansion feature 180, 280 is welded to the threaded rod section 160 after such features are threadably engaged instead of using adhesive.

In some embodiments the expansion feature 180, 280 does not have a threaded opening 182 and is welded to the threaded rod section 160.

The threaded rod section 160 does not need to be threaded along its whole length and only needs to be threaded sufficiently far along its length in order to enable a nut to be threadably engaged with it in order to secure an object to a concrete surface after anchor installation.

In some embodiments expansion sleeve 120 may have more or less than six fingers 125 provided that the dimensions of $L_{FINGER}$, $L_{RAMP}$ and $W_{SLOT}$ remain within the ranges set out in table 2.

What is claimed is:

1. An undercut anchor comprising: an at least partially threaded rod portion having an outer thread diameter $D_{ROD}$; an expansion feature coupled to the rod portion; an expansion sleeve having an outer diameter $D_{OUTER\ SLEEVE}$, an inner diameter $D_{INNER\ SLEEVE}$ and a wall thickness $T_{SLEEVE}$ wherein the expansion sleeve has a plurality of circumferentially distributed fingers which are configured to flex outwards when a ramp portion of length $L_{RAMP}$ of each of the respective fingers is forced against the expansion feature during installation of the undercut anchor, the fingers each having a length $L_{FINGER}$ and a distance therebetween of $W_{SLOT}$; wherein the undercut anchor is configured according to at least one of the following:

the ratio of $D_{OUTER\ SLEEVE}$ to $D_{ROD}$ is between 1.50 to 2.00;
the ratio of $D_{INNER\ SLEEVE}$ to $D_{ROD}$ is between 1.00 to 1.15;
the ratio of $T_{SLEEVE}$ to $D_{ROD}$ is between 0.25 to 0.50;
the ratio of $L_{FINGER}$ to $D_{ROD}$ is between 1.00 to 1.50;
the ratio of $L_{RAMP}$ to $D_{ROD}$ is between 0.15 to 0.30;
the ratio of $W_{SLOT}$ to $D_{ROD}$ is between 0.05 to 0.20, and
wherein the plurality of circumferentially distributed fingers are flexed outward to form an expansion angle between about 37° to about 43°, the undercut anchor configured to the following dimensions:

| | |
|---|---|
| $D_{ROD}$ (Inches) | 0.375 |
| $D_{OUTER\ SLEEVE}$ (Inches) | 0.6875 |
| $D_{INNER\ SLEEVE}$ (Inches) | 0.405 |
| $T_{SLEEVE}$ (Inches) | 0.14125 |
| $L_{FINGER}$ (Inches) | 0.495 |
| $L_{RAMP}$ (Inches) | 0.075 |
| $W_{SLOT}$ (Inches) | 0.055. |

2. An undercut anchor comprising: an at least partially threaded rod portion having an outer thread diameter $D_{ROD}$; an expansion feature coupled to the rod portion; an expansion sleeve having an outer diameter $D_{OUTER\ SLEEVE}$, an inner diameter $D_{INNER\ SLEEVE}$ and a wall thickness $T_{SLEEVE}$ wherein the expansion sleeve has a plurality of circumferentially distributed fingers which are configured to flex outwards when a ramp portion of length $L_{RAMP}$ of each of the respective fingers is forced against the expansion feature during installation of the undercut anchor, the fingers each having a length $L_{FINGER}$ and a distance therebetween of $W_{SLOT}$; wherein the undercut anchor is configured according to at least one of the following:

the ratio of $D_{OUTER\ SLEEVE}$ to $D_{ROD}$ is between 1.50 to 2.00;
the ratio of $D_{INNER\ SLEEVE}$ to $D_{ROD}$ is between 1.00 to 1.15;
the ratio of $T_{SLEEVE}$ to $D_{ROD}$ is between 0.25 to 0.50;
the ratio of $L_{FINGER}$ to $D_{ROD}$ is between 1.00 to 1.50;
the ratio of $L_{RAMP}$ to $D_{ROD}$ is between 0.15 to 0.30;
the ratio of $W_{SLOT}$ to $D_{ROD}$ is between 0.05 to 0.20, and wherein the plurality of circumferentially distributed fingers are flexed outward to form an expansion angle between about 37° to about 43°, the undercut anchor configured to the following dimensions:

| | |
|---|---|
| $D_{ROD}$ (Inches) | 0.5 |
| $D_{OUTER\ SLEEVE}$ (Inches) | 0.8125 |
| $D_{INNER\ SLEEVE}$ (Inches) | 0.535 |
| $T_{SLEEVE}$ (Inches) | 0.13875 |
| $L_{FINGER}$ (Inches) | 0.532 |
| $L_{RAMP}$ (Inches) | 0.112 |
| $W_{SLOT}$ (Inches) | 0.055. |

3. An undercut anchor comprising: an at least partially threaded rod portion having an outer thread diameter $D_{ROD}$; an expansion feature coupled to the rod portion; an expansion sleeve having an outer diameter $D_{OUTER\ SLEEVE}$, an inner diameter $D_{INNER\ SLEEVE}$ and a wall thickness $T_{SLEEVE}$ wherein the expansion sleeve has a plurality of circumferentially distributed fingers which are configured to flex outwards when a ramp portion of length $L_{RAMP}$ of each of the respective fingers is forced against the expansion feature during installation of the undercut anchor, the fingers each having a length $L_{FINGER}$ and a distance therebetween of $W_{SLOT}$; wherein the undercut anchor is configured according to at least one of the following:

the ratio of $D_{OUTER\ SLEEVE}$ to $D_{ROD}$ is between 1.50 to 2.00;
the ratio of $D_{INNER\ SLEEVE}$ to $D_{ROD}$ is between 1.00 to 1.15;
the ratio of $T_{SLEEVE}$ to $D_{ROD}$ is between 0.25 to 0.50;
the ratio of $L_{FINGER}$ to $D_{ROD}$ is between 1.00 to 1.50;
the ratio of $L_{RAMP}$ to $D_{ROD}$ is between 0.15 to 0.30;
the ratio of $W_{SLOT}$ to $D_{ROD}$ is between 0.05 to 0.20, and wherein the plurality of circumferentially distributed fingers are flexed outward to form an expansion angle between about 37° to about 43°, the undercut anchor configured to the following dimensions:

| | |
|---|---|
| $D_{ROD}$ (Inches) | 0.625 |
| $D_{OUTER\ SLEEVE}$ (Inches) | 1 |
| $D_{INNER\ SLEEVE}$ (Inches) | 0.665 |
| $T_{SLEEVE}$ (Inches) | 0.1675 |
| $L_{FINGER}$ (Inches) | 0.661 |
| $L_{RAMP}$ (Inches) | 0.149 |
| $W_{SLOT}$ (Inches) | 0.055. |

4. An undercut anchor comprising: an at least partially threaded rod portion having an outer thread diameter $D_{ROD}$; an expansion feature coupled to the rod portion; an expansion sleeve having an outer diameter $D_{OUTER\ SLEEVE}$, an inner diameter $D_{INNER\ SLEEVE}$ and a wall thickness $T_{SLEEVE}$ wherein the expansion sleeve has a plurality of circumferentially distributed fingers which are configured to flex outwards when a ramp portion of length $L_{RAMP}$ of each of the respective fingers is forced against the expansion feature during installation of the undercut anchor, the fingers each having a length $L_{FINGER}$ and a distance therebetween of $W_{SLOT}$; wherein the undercut anchor is configured according to at least one of the following:

the ratio of $D_{OUTER\ SLEEVE}$ to $D_{ROD}$ is between 1.50 to 2.00;
the ratio of $D_{INNER\ SLEEVE}$ to $D_{ROD}$ is between 1.00 to 1.15;
the ratio of $T_{SLEEVE}$ to $D_{ROD}$ is between 0.25 to 0.50;
the ratio of $L_{FINGER}$ to $D_{ROD}$ is between 1.00 to 1.50;
the ratio of $L_{RAMP}$ to $D_{ROD}$ is between 0.15 to 0.30;
the ratio of $W_{SLOT}$ to $D_{ROD}$ is between 0.05 to 0.20, and wherein the plurality of circumferentially distributed fingers are flexed outward to form an expansion angle between about 37° to about 43°, the undercut anchor configured to the following dimensions:

| | |
|---|---|
| $D_{ROD}$ (Inches) | 0.75 |
| $D_{OUTER\ SLEEVE}$ (Inches) | 1.25 |
| $D_{INNER\ SLEEVE}$ (Inches) | 0.79 |
| $T_{SLEEVE}$ (Inches) | 0.23 |
| $L_{FINGER}$ (Inches) | 0.881 |
| $L_{RAMP}$ (Inches) | 0.187 |
| $W_{SLOT}$ (Inches) | 0.055. |

\* \* \* \* \*